(12) United States Patent
Kato et al.

(10) Patent No.: US 7,617,614 B2
(45) Date of Patent: Nov. 17, 2009

(54) MAGNETIC SCALE MANUFACTURING METHOD AND MAGNETIC SCALE

(75) Inventors: Kojiro Kato, Hamamatsu (JP); Yoshinori Hayashi, Iwata (JP)

(73) Assignee: Yamaha Corporation, Hamamatsu-Shi (JP)

( * ) Notice: Subject to any disclaimer, the term of this patent is extended or adjusted under 35 U.S.C. 154(b) by 0 days.

(21) Appl. No.: 11/726,873

(22) Filed: Mar. 23, 2007

(65) Prior Publication Data

US 2007/0220772 A1    Sep. 27, 2007

(30) Foreign Application Priority Data

Mar. 24, 2006 (JP) ............... 2006-082579
Sep. 7, 2006 (JP) ............... 2006-242506

(51) Int. Cl.
*G01B 7/00* (2006.01)
(52) U.S. Cl. ............ 33/708; 33/706; 33/DIG. 1; 324/207.24
(58) Field of Classification Search ......... 33/706, 33/708, DIG. 1; 324/207.11, 207.24
See application file for complete search history.

(56) References Cited

U.S. PATENT DOCUMENTS

| 5,532,598 | A | * | 7/1996 | Clark et al. ............... 324/326 |
| 5,568,760 | A | * | 10/1996 | Volzer ............... 92/5 R |
| 5,779,367 | A | * | 7/1998 | Obara ............... 384/8 |
| 5,945,824 | A | * | 8/1999 | Obara et al. ............... 324/207.22 |
| 6,690,160 | B2 | * | 2/2004 | Gray et al. ............... 324/207.24 |
| 7,353,618 | B2 | * | 4/2008 | Shibata et al. ............... 33/708 |

FOREIGN PATENT DOCUMENTS

| JP | 2748166 | 2/1998 |
| JP | 2006-049302 | 2/2006 |

OTHER PUBLICATIONS

First Office Action for Chinese Patent Application No. 200710091809X, issued Nov. 7, 2008 (10 pages).
Kato Kojiro, specification for U.S. Appl. No. 11/333,816, filed on Jan. 17, 2006.

* cited by examiner

*Primary Examiner*—Amy Cohen Johnson
(74) *Attorney, Agent, or Firm*—Morrison & Foerster LLP

(57) ABSTRACT

First, an inner tube member is accommodated in an outer tube member. Then, rigid powder, having high rigidity and a hard-to-magnetize characteristic, into the inner tube member. Next, magnetic powder is filled into a recessed portion of the inner tube member. Then, the inner tube member is drawn out of the outer tube member. Then, a composite filler composed of the rigid powder, magnetic powder and outer tube member is subjected to a cold hydrostatic pressure pressing process as pre-processing. Next, the composite filler is heated and solidified into a billet. Then, the billet is subjected to a hot extrusion process so that it is formed into a bar-shaped workpiece. The bar-shaped workpiece is rolled onto a roller, and then the outer tube member is peeled off. Next, the bar-shaped workpiece is subjected to a cutting process so that it is formed into an elongated bar. Then, a magnetic section of the elongated bar is magnetized into a scale structure.

12 Claims, 7 Drawing Sheets

MAGNETIC SCALE MANUFACTURING METHOD AND MAGNETIC SCALE

BACKGROUND OF THE INVENTION

The present invention relates to magnetic scales for position sensors that can be suitably use for position control, position detection, etc. in various devices and particularly suitable for use in bad environment.

Among various examples of the conventionally-known position control techniques is a slide volume control device for a mixer apparatus disclosed in Japanese Patent Publication No. 2748166. In the slide volume control device disclosed in the No. 2748166 patent publication, a slider is supported by two guide rails, and the slider (with a knob and slider terminal attached thereto) is moved by a drive motor. Operational amount (e.g., voltage value) corresponding to a position of the slider is detected by the slider terminal attached to the slider and a resistor unit contacting the slider terminal. Position of the slider is controlled through rotation of the drive motor. Control of a rotational position of such a drive motor depends on a rotational amount of the motor itself.

In such a slide volume control device, it is required that the slider smoothly move and positional control of the slider be accurate and precise both during automatic drive by the motor and during manual drive. Namely, appropriate slide-guiding performance, durability of a slide-guiding structure and accuracy-related durability is required for long-time use. However, because the guide-dedicated structure in the form of the guide rails, the slider-operational-amount detecting structure in the form of the slider terminal and resistor unit and the slider-position controlling structure based on the rotational amount control of the drive motor are separate from one another, the device is complicated in construction and requires high cost.

Further, it is difficult to maintain, for a long time, the accuracy of both of the structure for holding the slider by means of the guide rails and the structure for causing the slide terminal to contact the resistor unit. Furthermore, if a user attempts to maintain the accuracy of both of the structures, clearances between the guide rails and the slider and other requirements tend to become severer, which would make smooth operation of the slider difficult to achieve.

The assignee of the instant application developed a technique for using a magnetic scale and magnetic sensor to directly detect a position of a slider (operator) in a slider volume control device, and the assignee filed a patent application for the developed technique (see Japanese Patent Application Laid-open Publication No. 2006-049302, which corresponds to U.S. patent application Ser. No. 11/333,816 filed on Jan. 17, 2006). According to the developed technique, two parallel movement guide sections are constructed of main and auxiliary movement guides each in the form of a round bar, and a moving block, including an operator and magnetic sensor, is slidably supported on the two movement guide sections. Further, the auxiliary movement guide is constructed as a magnetic scale, and it includes a shaft of a substantial round rod shape, formed by irregular shape drawing of nonmagnetic stainless steel, and a magnetic member embedded in a longitudinal groove formed in the shaft. Position of the moving block is detected by the magnetic sensor detecting the magnetic poles formed in the magnetic member of the auxiliary movement guide. Because the position of the moving block is detected by such a combination of the magnetic scale and magnetic sensor, the detecting accuracy is not lowered even when dust has entered a gap between the magnetic scale and the magnetic sensor; thus, the technique employing the combination of the magnetic scale and magnetic sensor can achieve the advantageous benefit in that it is impervious to dust and dirt.

Also, there have been known printer apparatus where a slider with a print head mounted thereon is moved along a guide shaft. Position of such a print head is controlled by, for example, controlling an amount of movement of a timing belt driving the slider. In this case too, it is desirable that the position of the print head be detectable directly by a magnetic scale and magnetic sensor, because the combination of the magnetic scale and magnetic sensor is impervious to dust and dirt.

Also known today is a technique for controlling a motorcycle or four-wheel vehicle to reduce shaky, jolting movement, etc. of the motorcycle or vehicle by watching an amount of movement of the motorcycle or vehicle. In this case too, it is desirable that the position of the print head be directly detectable by a magnetic scale and magnetic sensor, because the combination of the magnetic scale and magnetic sensor is impervious to dust and dirt.

In the case where the movement guide supporting the movement block is constructed as a magnetic scale, it is conceivable to form the entire movement guide of a permanent magnetic material, such as an alloy or ferrite (type) permanent magnetic material. However, the alloy permanent magnetic material is expensive, and the movement guide formed of the ferrite permanent magnetic material tends to be fragile and have poor durability. If the movement guide is composed mainly of a nonmagnetic stainless steel shaft of a substantial round bar shape as proposed by the assignee of the instant application, the movement guide can advantageously have superior durability. However, with the aforementioned proposed technique, where the movement guide is constructed by embedding the magnetic member in the longitudinal groove formed in the nonmagnetic stainless steel shaft, there is a possibility of part of the magnetic member undesirably peeling off from the shaft. Thus, the conventional technique still has room for improvement in terms of durability.

SUMMARY OF THE INVENTION

In view of the foregoing, it is an object of the present invention to provide an improved magnetic scale of high durability which is suitable for use as a movement guide and can reliably stand use in bad environment.

In order to accomplish the above-mentioned object, the present invention provides an improved magnetic scale manufacturing method, which comprises: a first step of forming and providing a double tube assembly of a nested structure with an inner tube member accommodated in an outer tube member, the inner tube member having, in part of an outer periphery thereof, a recessed portion, a distance from an inner wall surface of the outer tube member to an outer wall surface of the recessed portion of inner tube member is greater than a distance from the inner wall surface of the outer tube member to the outer wall surface of another section, than the recessed portion, of the inner tube member; a second step of filling rigid powder, having high rigidity and hard-to-magnetize characteristic, into a center region of the nested structure; a third step of filling magnetic powder into the recessed portion between the inner tube member and the outer tube member; a fourth step of removing the inner tube member after the first step, the second step and the third step having been performed in desired order; a fifth step of heating and solidifying a composite having remained after removal of the inner tube member; a sixth step of stretching the composite, heated and solidified by the fifth step, into a bar-shaped workpiece; a seventh step of peeling off the outer tube member from the bar-shaped workpiece stretched by the sixth step; and an eighth step of magnetizing, into a magnetic scale structure, a magnetic section of the bar-shaped workpiece formed by heating and solidifying the magnetic powder of the bar-shaped workpiece from which the outer tube member has been peeled off. The terms "hard-to-magnetize characteristic" are used herein to mean "nonmagnetic characteristic" as well.

With the aforementioned arrangements, the rigid shaft section formed by heating and solidification of the rigid powder and the magnetic section formed by heating and solidification of the magnetic powder are cohered together along their respective joint surfaces, so that, like the well-known bimetal, the two sections sufficiently withstand shakes and vibrations and high temperatures and will not easily peel off or detach from each other. Further, the present invention can manufacture a small-size, high-accuracy and high-precision magnetic scale by forming the double tube assembly with a relatively large size and then stretching the composite, from which the inner tube member has been removed, through a rolling process or otherwise.

In an embodiment, the composite heated and solidified in the fifth step is subjected to a hot extrusion process in the sixth step.

In an embodiment, the composite heated and solidified in the fifth step is subjected to a hot rolling process in the sixth step.

In an embodiment, the composite heated and solidified in the fifth step is subjected not only to a hot rolling process, but also to extrusion, rolling and drawing processes in permutation and simultaneously, in the sixth step.

In an embodiment, the recessed portion of the inner tube member is formed into an undercut structure with respect to an inner-outward direction (i.e., direction of a normal line) of the nested structure of the doublet tube assembly (see (A) and (B) of FIG. 6).

In an embodiment, the rigid powder is powder of stainless steel, brass or duralumin.

In an embodiment, the magnetic powder is powder of alloy permanent magnet.

According to another aspect of the present invention, there is provided an improved magnetic scale, which comprises: an elongated rigid shaft section having high rigidity and hard-to-magnetize characteristic including a nonmagnetic characteristic; and a magnetic section disposed as a layer uniformly and integrally on the rigid shaft section in a longitudinal direction of the rigid shaft section, the magnetic section having a smaller cross-sectional area than the elongated rigid shaft section, the magnetic section being secured to part of a surface of the rigid shaft section and magnetized to a magnetic scale structure, the magnetic section having opposite side joint surfaces (CF in (B) of FIG. 5 and (B) of FIG. 7) along which the magnetic section is joined with the rigid shaft section, the opposite side joint surfaces being formed into an undercut structure with respect to an inner-outer direction of the rigid shaft section as viewed in cross-section ((B) of FIG. 5 and (B) of FIG. 7). With such arrangements, the magnetic section can be reliably prevented from peeling off against a force applied in the direction of the centerline. The rigid shaft section may be formed of nonmagnetic metal, resin or the like.

According to still another aspect of the present invention, there is provided an improved magnetic scale, which comprises: an elongated rigid shaft section having high rigidity and high magnetic permeability; and a magnetic section disposed as a layer uniformly and integrally on the rigid shaft section in a longitudinal direction of the rigid shaft section, the magnetic section having a smaller cross-sectional area than the elongated rigid shaft section, the magnetic section being secured to part of a surface of the rigid shaft section and magnetized to a magnetic scale structure, the magnetic section having opposite side joint surfaces (CF in (B) of FIG. 5 and (B) of FIG. 7) along which the magnetic section is joined with the rigid shaft section, the opposite side joint surfaces being formed into an undercut structure with respect to an inner-outer direction of the shaft section as viewed in cross-section ((B) of FIG. 5 and (B) of FIG. 7). The rigid shaft section mat be formed of paramagnetic metal, ferromagnetic metal, resin having a high-magnetic-permeability material mixed therein, or the like.

In an embodiment, the magnetic section is formed of an alloy permanent magnet material.

In an embodiment, the magnetic section is formed of a copper-nickel alloy.

In an embodiment, the rigid shaft section is formed of metal or high-strength resin, and the magnetic section is a resin-mixed magnet and formed by being insert-molded to the rigid shaft section. Thus, the rigid shaft section can be formed, at low cost, of metal or high-strength resin through a drawing process.

In an embodiment, the rigid shaft section is formed of metal or high-strength resin having a material of a high magnetic permeability mixed therein, and the magnetic section is a resin-mixed magnet and formed by being insert-molded to the rigid shaft section. Thus, the magnetic section can be easily formed by injecting the resin-mixed magnet (e.g., plastic magnet) into the rigid shaft section.

In an embodiment, the rigid shaft section is formed of the high-strength resin, and the magnetic section is formed through primary molding and the rigid shaft section is formed onto the magnetic section through secondary molding. Namely, the rigid shaft section and the magnetic section are formed by two-color molding.

In an embodiment, the magnetic section has a layer thickness in a range from 0.1 mm to 1 mm.

Namely, according to the magnetic scale manufacturing method of the present invention, the rigid shaft section and the magnetic section are joined together along their respective joint surfaces, so that, like the well-known bimetal, the two sections sufficiently withstand shakes and vibrations and high temperatures and will not easily peel off or detach from each other. Thus, the present invention can provide a magnetic scale of high durability that can reliably stand use in bad environment.

With the magnetic scale according to one aspect of the present invention, the magnetic section can be reliably prevented from peeling off against a force applied in the direction of the centerline. Thus, the magnetic scale can have high durability and reliably stand use in bad environment.

With the magnetic scale according to another aspect of the present invention, where the rigid shaft section covering the magnetic section has a high magnetic permeability, the rigid shaft section achieves a magnetic shield effect that can shield the magnetic section from an external magnetic field.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which.

DETAILED DESCRIPTION OF THE INVENTION

Figure 1:
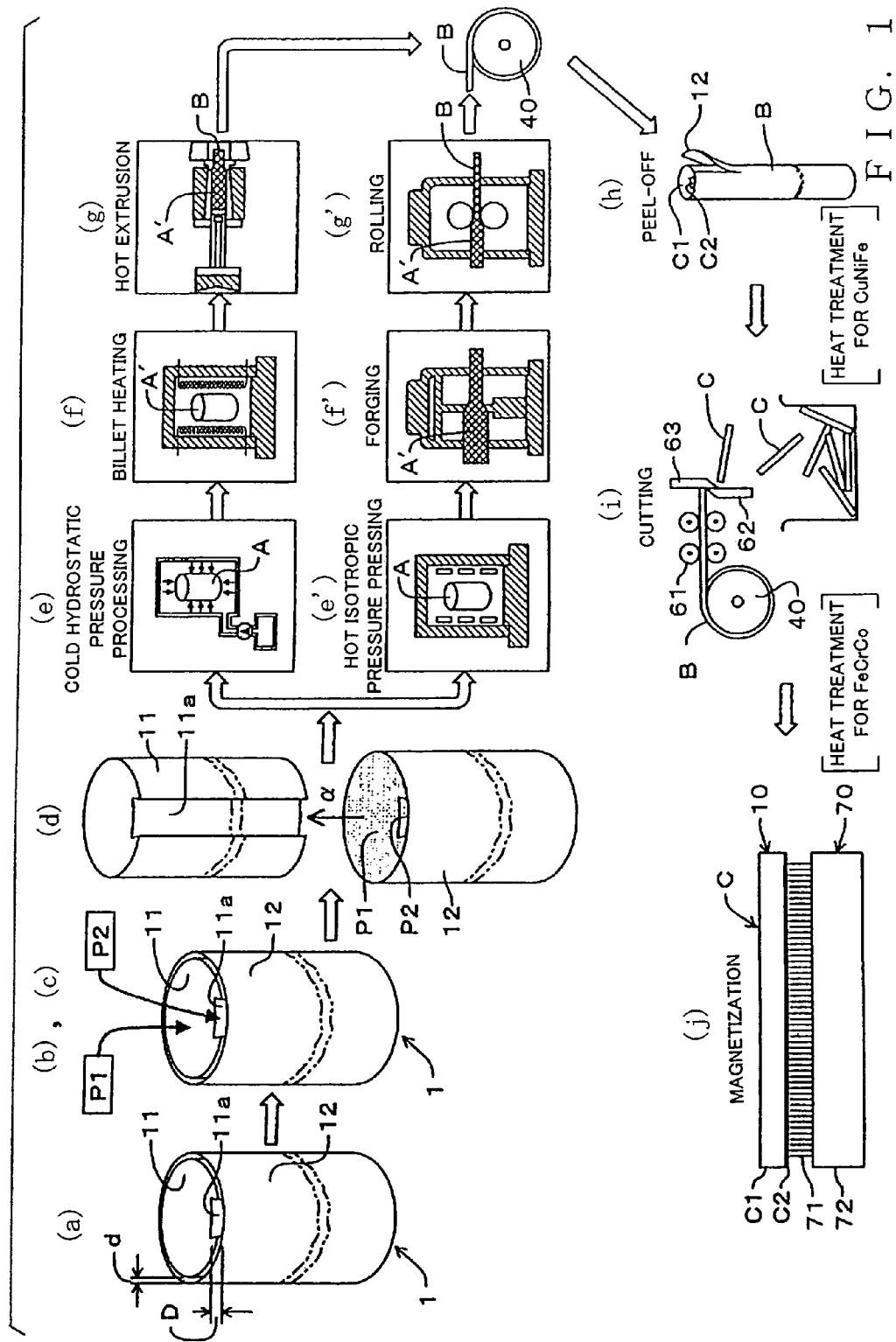
FIG. 1 is a diagram showing various steps for manufacturing an embodiment of a magnetic scale using a magnetic scale manufacturing method in accordance with an embodiment of the present invention.

Note that, in the accompanying drawings, hatchings indicative of sectional surfaces are omitted as necessary. FIG. 1 is a diagram showing various steps of a magnetic scale manufacturing method of the present invention, where the steps are indicated by parenthesized alphabetical letters. Examples of sizes, materials used in the method will be described following a description about the steps.

In FIG. 1, (a) indicates a first step of preparing a double tube assembly 1 of a nested structure. The double tube assembly 1 comprises an inner tube member 11 and an outer tube member 12 with the inner tube member 11 accommodated therein. The inner tube member 11 is in the form of a cylinder formed by rolling up a thin plate-shaped member so that it is open at its opposite ends. The inner tube member 11 has, in part of its outer periphery, a recessed portion 11a formed as a groove parallel to its generating line. The outer tube member 12 is in the form of a cylinder formed of a thin plate-shaped member and having a bottom. Clearance d between the outer peripheral surface of the inner tube member 11 and the inner peripheral surface of the outer tube member 12 is shown in the figure in an exaggerated manner; namely, in practice, the clearance d is only a minute clearance to allow the inner tube member 11 to be detached from the outer tube member 12. Further, although the double tube assembly 1 is shown in the figure with a portion omitted using two-dot-dash lines, it has an appropriate length determined in relation to the diameter (thickness).

The inner tube member 11 has the recessed portion 11a in the outer periphery as noted above, and a distance D from the inner wall surface of the outer tube member 12 to the outer wall surface of the recessed portion 11a of inner tube member 11 is greater than a distance from the inner wall surface of the outer tube member 12 to the outer wall surface of the remaining section, other than the recessed portion, of the inner tube member 11. Such inner and outer tube members 11 and 12 together constitute the nested double tube assembly 1.

The inner tube member 11 may be formed of either a metal or plastic material and preferably has a small thickness in the range of about 0.5 mm-2 mm. The outer tube member 12 may be formed of a metal material, such as stainless steel, copper or aluminum, and preferably has a small thickness in the range of about 0.1 mm-0.8 mm in view of a peel-off process to be later described. Sizes of the inner and outer tube members 11 and 12 may be determined in accordance with a lot and an expected diameter of a final product having been subjected to stretching through a later-described extrusion or rolling process; for example, the diameters of the inner and outer tube members 11 and 12 are in the range of about 10 mm-100 mm.

Further, in FIG. 1, (b) indicates a second step of filling rigid powder P1, having high rigidity and hard-to-magnetize characteristic, into a center region (i.e., into the inner tube member 11) of the nested double tube assembly 1. (c) indicates a third step of filling magnetic powder P2 into the aforementioned recessed portion 11a located between the inner tube member 11 and the outer tube member 12. The filling of the rigid powder P1 and magnetic powder P2 may be performed either by manual operation or by mechanical operation. Although either one of the second step (b) and third step (c) may be performed ahead of the other, it is better to perform the second step (b) ahead of the third step (c) if the thin plate-shaped member forming the inner tube member 11 is particularly thin, in order to avoid deformation of the inner tube member 11. Alternatively, the above-mentioned steps may be performed in the order of "second step (b)→first step (a)→third step (c). In such a case, the outer tube member 12 is formed so as to open at its opposite ends, the inner tube member 11 is placed on the relatively-large bottom plate or the like, and then the rigid powder P1 is filled into the interior of the inner tube member 11 (second step (b)). After that, the outer tube member 12 is fitted over the inner tube member 11 along the outer peripheral surface of the latter (first step (a)). Then, the magnetic powder P2 is filled into the recessed portion 11a between the inner tube member 11 and the outer tube member 12. Then, a fourth step (d) follows.

In the fourth step (d), the inner tube member 11 is removed (pulled out) from the outer tube member 12, in a direction of arrow α, with the rigid powder P1 and magnetic powder P2 filled within the tube assembly 1. Because the inner tube member 11 is open at the opposite ends, the recessed portion 11a of the inner tube member 11 slips between the rigid powder P1 and magnetic powder P2 while the other section than the recessed portion 11a of the inner tube member 11 slips between the rigid powder P1 and the inner peripheral surface of the outer tube member 12, during the pulling-out from the outer tube member 12. As a consequence, a depression, corresponding in shape to the recessed portion 11a of the inner tube member 11, is formed in the rigid powder P1 with the magnetic powder P2 filled in the depression; in this manner, the outer tube member 12 is filled with the rigid powder P1 and magnetic powder P2. Mass of the rigid powder P1 and magnetic powder P2 will hereinafter be referred to as "composite filler A".

As a result of the removal, from the outer tube member 12, of the inner tube member 11, the heights of the rigid powder P1 and magnetic powder P2 slightly decrease by amounts corresponding to the volume of the thin plate-shaped member of the inner tube member 11; specifically, the decrease in the height of the rigid powder P1 is greater than that of the magnetic powder P2, because the rigid powder P1 had a greater area of contact with the inner tube member 11 than the magnetic powder P2. Therefore, amounts of the rigid powder P1 and magnetic powder P2 to be filled in the second and third steps (b) and (c) are appropriately set so that the rigid powder P1 and magnetic powder P2 can have the same height within the outer tube member 12 after the removal, from the outer tube member 12, of the inner tube member 11. Needless to say, it is preferable that the wall thickness of the inner tube member 11 be as small as possible as long as it can present a certain degree of rigidity.

Following the fourth step (d) are steps of performing various processes on the composite filler A obtained in the fourth step (d). These following steps may be either a group of "pre-processing step (e)→step (f)→step (g)" (i.e., "cold hydrostatic pressure pressing & hot extrusion scheme" that will hereinafter be referred to as "first scheme") or a group of "step (e')→step (f')→post-processing step (g→)" (i.e., "hot isotropic pressure pressing & forging scheme" that will hereinafter be referred to as "second scheme").

The pre-processing step (e) in the first scheme is a "cold hydrostatic pressure pressing step", where the composite filler A is immersed in water within a well-closed container and uniform pressure is applied to the composite filler A by a water pressure within the container. In this manner, the rigid powder P1 and magnetic powder P2 of the composite filler A are hardened together. The next step (f) is a "billet heating step" (fifth step), where the composite filler A having undergone the pre-processing step (e) is heated up to a hardening temperature of about 1,100° C. Thus, the composite filler A is heated and solidified into a billet A' (round billet in this case) in a solid solution state. The next step (g) is a "hot extrusion step" (sixth step), where a hot extrusion process is performed on the billet A' in a hot solid solution state to provide a bar-shaped workpiece B of a predetermined reduced diameter.

Step (e') in the second scheme is a "hot isotropic pressure pressing step" (fifth step), where the composite filler A is pressed and heated up to a predetermined hardening temperature of about 1,100° C. within a pressing/heating furnace. Thus, the composite filler A is heated and solidified into a billet A' in a solid solution state. The next step (f) is a "forging step" (sixth step), where pressure forming is performed on the billet A' in a solid solution state to reduce the diameter of the billet A' to some degree. The next post-processing step (g') is a "rolling step", where the pressure-formed billet A' is rolled into a bar-shaped workpiece B of a predetermined reduced diameter. This rolling step may be repeated a plurality of times.

The bar-shaped workpiece B formed with the predetermined reduced diameter in the aforementioned manner is rolled via a roller 40. During the time that the bar-shaped workpiece B is subjected to the "hot extrusion step" (g) of the first scheme or "rolling step" (g') as the post-processing step of the second scheme and then wound on the roller 40, the bar-shaped workpiece B is set to a temperature of several hundred degrees Celsius between predetermined annealing and tempering temperatures.

The bar-shaped workpiece B wound on the roller 40 has the thin plate-shaped member, forming the outer tube member 12, attached to its surface in a stretched condition. Thus, the outer tube member 12 is peeled off from the bar-shaped workpiece B in a seventh or "peel-off step" (h). As shown at "peel-off (h')" in (A) of FIG. 2, this "peel-off step" may be implemented by providing a peeling-off jig 51 between the hot extrusion step (g) or post-processing step (g') and the step of causing the workpiece B to be wound on the roller 40. The peeling-off jig 51 comprises netted members 51a and 51b for vertically sandwiching the bar-shaped workpiece B having undergone the extrusion process or rolling process. Interval between the hot extrusion step (g) or post-processing step (g') and the roller 40 is in the range of 1 m-2 m, and the netted members 51a and 51b contact the upper and lower surfaces of the bar-shaped workpiece B over a length corresponding to about 50 to 80% of the interval, and the netted members 51a and 51b gradually peel off the outer tube member 12 by frictionally rubbing off the tube member 12. Alternatively, the peel-off step may be arranged to peel off the outer tube member 12 from the bar-shaped workpiece B through a wire-drawing process by dies 51c and 51d, as shown at (h") in (B) of FIG. 2.

Alternatively, the outer tube member 12 may be peeled off by a sheet-shaped file in place of, or in addition to, the netted members 51a and 51b. If the outer tube member 12 can not be peeled off by the "peel-off step" being performed only once, the "peel-off step" may be repeated a plurality of times. In case the outer tube member 12 can not be peeled off even by the "peel-off step" being repeated a plurality of times, a finish process, using a sheet-shaped file or the like, may be performed on an elongated bar-shaped workpiece C before a later-described magnetization process.

The bar-shaped workpiece B, from which the outer tube member 12 has been peeled off, has a rigid shaft section C1 formed through the heating/solidification of the rigid powder P1, and a magnetic section C2 formed through the heating/solidification of the magnetic powder P2. In order to achieve a magnetic characteristic (i.e., width of a hysteresis magnetization curve) of the magnetic section C2, a heat treatment step is performed under suitable conditions and at a suitable phase depending on the material of the magnetic section C2 (magnetic powder P2).

Where the magnetic section C2 is of a CuNiFe type, heat treatment is performed following the "peel-off step" (h). For example, a wiredrawing process is performed on the bar-shaped workpiece B from which the outer tube member 12 has been peeled off, and then primary aging treatment is performed on the bar-shaped workpiece B for two hours in argon gas or hydrogen gas atmosphere of 600-700° C. In this way, a magnetic characteristic is produced in the magnetic section C2. Next, the bar-shaped workpiece B is subjected to secondary aging treatment under the same environment conditions, to enhance the magnetic characteristic. The magnetic characteristic, i.e. hysteresis magnetization curve, can be controlled in accordance with a processing ratio between the primary aging treatment and the secondary aging treatment, aging temperatures of the primary and secondary aging treatment and time conditions. Upon completion of the heat treatment, the bar-shaped workpiece B is subjected to a straightening process, and then the bar-shaped workpiece B is passed to a cutting process (i).

Figure 3:
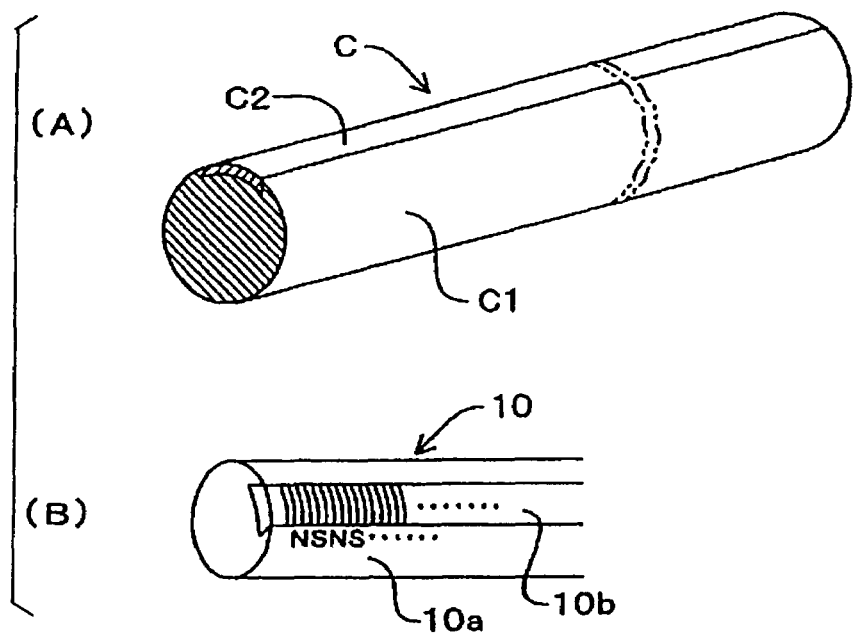
FIG. 3 is a view showing examples of magnetization of an elongated bar and magnetic scale in the embodiment.

In the cutting process (i), the bar-shaped workpiece B pulled out via the roller 40 is fed out via feed rollers 61, so that it is cut, by means of a fixed blade 62 and vertically-movable blade 63, into a half-finished product in the form of an elongated bar C having a predetermined length. As shown in (A) of FIG. 3, the elongated bar C has the rigid shaft section C1 formed through the heating/solidification of the rigid powder P1, and the magnetic section C2 formed through the heating/solidification of the magnetic powder P2. The rigid shaft section C1 and the magnetic section C2 have been cohered together, during the heating/solidification, along their respective joint surfaces. Here, "cohered together" means a state in which, like the well-known bimetal, the rigid shaft section C1 and the magnetic section C2 can sufficiently or reliably withstand shakes and vibrations and high temperatures (below the quenching temperature) and will not easily peel off or detach from each other.

Where the magnetic section C2 is of a FeCrCo type, a cold drawing process is performed on the bar-shaped workpiece B prior to the cutting process, and then a uniformization process, such as solution treatment, is performed for five minutes in argon gas atmosphere of 1,020° C. Then, the bar-shaped workpiece B is subjected to a skin-pass rolling process (i.e., temper rolling with a low reduction ratio), straightening process and then a cutting process similar to the aforementioned. After the cutting process, aging treatment is performed in environment corresponding to a designated temperature pattern, and heat treatment is performed to impart a magnetic characteristic to the magnetic section C2. Upon completion of the cutting process or heat treatment, centerless polishing is performed to polish the surface of the elongated bar C into a perfect circular cross section, without setting a center of the elongated bar C.

Further, in FIG. 1, (j) indicates an eighth or "magnetization" step using a magnetization device 70. The magnetization device 70 includes a multiplicity of needles 71 provided over a range corresponding to the length of one elongated bar C, and a circuit device 72 for forming magnetic poles in the needles 71. The needles 71 are provided to extend vertically with respective to the surface of the circuit device 72. The needles 71 are caused to contact the magnetic section C, and N and S poles are formed alternately in adjoining ones of the needles 71. In this way, the magnetic section C2 is polarized or magnetized to N and S poles alternating, along the length of the magnetic section C2, in short cycles (e.g., 400 μm cycles). Such poles are shown in (B) of FIG. 3 by a multiplicity of short lines. By the magnetic section C2 being magnetized to N and S poles, i.e. magnetized into a magnetic scale structure (i.e., scale-magnetized) in the aforementioned manner, there is provided a magnetic scale 10. The thus-provided magnetic scale 10 has the rigid shaft section C1 as its shaft section 10a, and the scale-magnetized magnetic section C2 as its scale section 10b.

Figure 2:
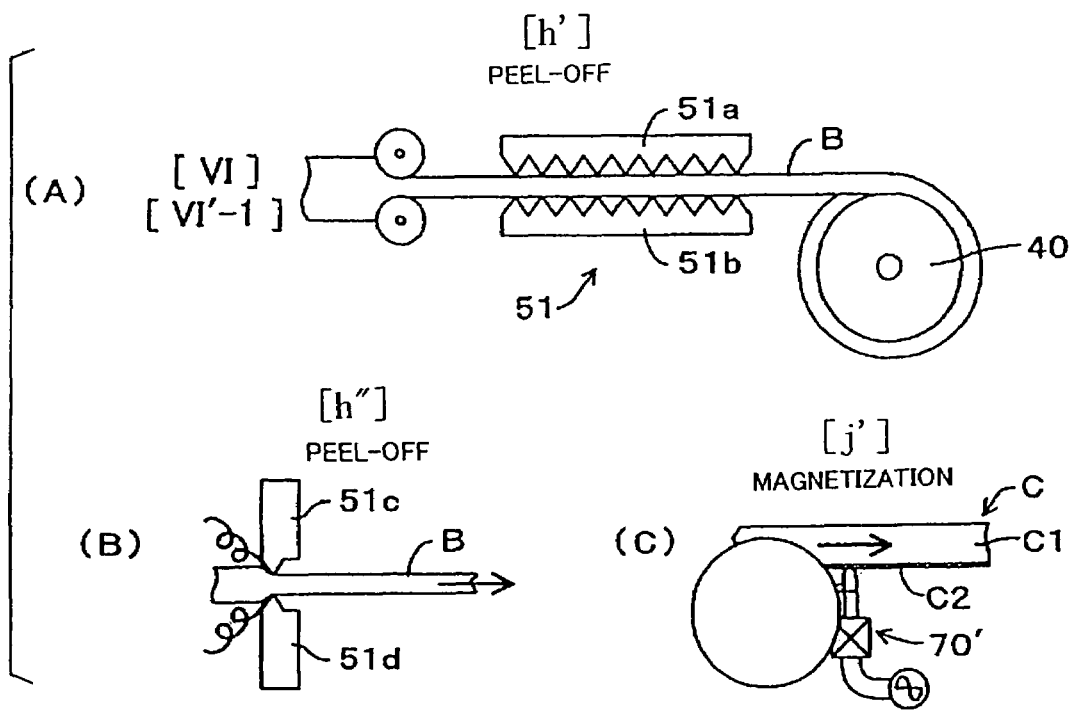
FIG. 2 is a view showing another example of a peel-off step in the embodiment of FIG. 1.

The aforementioned magnetization step may alternatively be performed in a manner as illustrated in (C) of FIG. 2. In this case, a magnetization device 70' comprising two needles 71' and a coil 72' is used. The needles 71' are caused to contact the magnetic section C2 of the elongated bar C, an A.C. current is supplied to the coil 72', and the elongated bar C is moved at a constant speed while a magnetic field is being sequentially reversed. In this way, a cyclic period of the N and S poles can be set in accordance with a frequency of the A.C. current and movement speed of the elongated bar C.

In the above-described steps for manufacturing the magnetic scale 10, the hot extrusion process is performed in the sixth step (g) of the first scheme (i.e., cold hydrostatic pressure pressing & hot extrusion scheme), or the rolling process is performed in the post-processing step (g') of the second scheme (i.e., hot isotropic pressure pressing & forging scheme), in order to stretch the heated/solidified billet A'. Alternatively, the stretching of the billet A' may be performed by a combination of the hot extrusion process of the first scheme and rolling process of the second scheme. For example, the heated/solidified billet A' may be stretched by being sequentially subjected to the extrusion process, rolling process and drawing process in permutation and simultaneously.

The above-mentioned rigid powder P1 is, for example, powder of a stainless steel (SUS), brass, duralumin or ceramic material, which resists rust and is rigid and hard to magnetize. Preferable example of the stainless steel material is nickel-chrome (8% Ni-18% Cr) stainless steel, austenite stainless steel developed from the 8% Ni-18% Cr stainless steel or the like, which has superior characteristics as nonmagnetic stainless steel.

The above-mentioned magnetic powder P2 is, for example, powder of a permanent magnet material. Preferable example of an alloy permanent magnet material suited for use as the magnetic powder P2 is Fe—Cr—Co, Fe—Cu—Ni, Mn—AL—C, Nd—Fe or the like, and a preferable example of a compound permanent magnet material suited for use as the magnetic powder P2 is RE-Co (typically, $Sm_2Co_{17}$) or the like. Of these, the Fe—Cr—Co permanent magnet material is suited for cold rolling, and particularly it may be subjected to wiredrawing. Further, a preferable example of an oxide permanent magnet material suited for use as the magnetic powder P2 is $y\text{-}Fes_2O_3$, Fe304 (magnet iron ore), $MO.Fe_2O_3$ (ferrite, where M is a divalent metal ion, such as Mn, Ni, Cu, Zn or Ba). In a case where powder of a hard-to-process magnet material is used, binding metal powder is also used.

The aforementioned rigid powder P1 and magnetic powder P2 is preferably spherically-shaped metal powder produced by vacuum melting and gas atomization, which has a predetermined particle diameter by being split through a sieve having an opening diameter in the range of 30 to 300 μm. Use of such spherically-shaped metal powder can not only increase the filling density of the powder but also minimize size variation after the heating/solidification.

Figure 4:
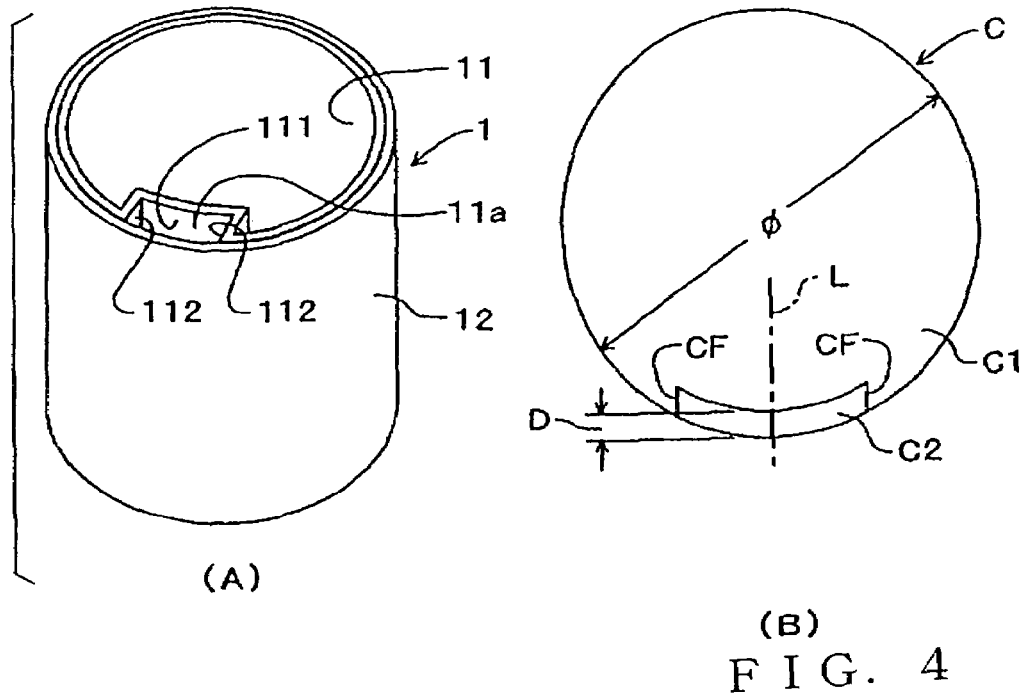
FIG. 4 is a view showing a shape of a double tube assembly and a sectional shape of an elongated bar in the embodiment.
Figure 5:
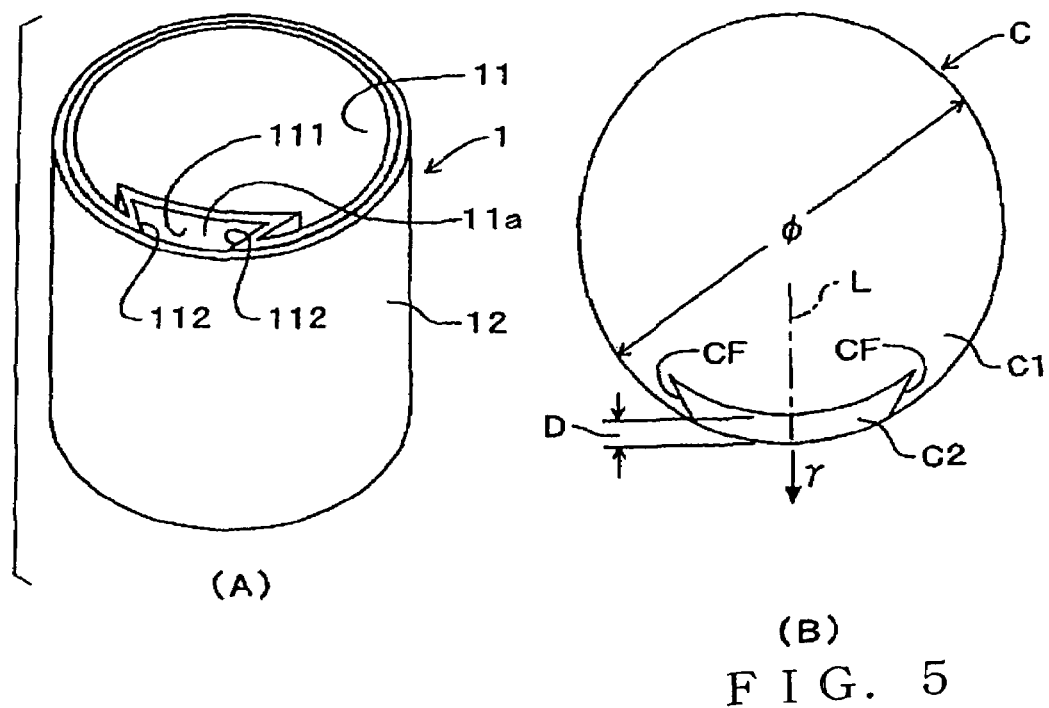
FIG. 5 is a view showing a shape of another example of the double tube assembly and a sectional shape of another example of the elongated bar in the embodiment.

Next, a description will be given about the shapes of the magnetic section C2 and rigid shaft section C1 of the elongated bar C. The elongated bar C has a columnar outer shape due to the cylindrical shape of the outer tube member 12, and the shape of the magnetic section C2 depends on the shape of the recessed portion 11a of the inner tube member 11. FIGS. 4 and 5 are views of the double tube assembly 1, which particularly show examples of shapes of the inner tube member 11 and examples of sectional shapes of the elongated bar C made using the inner tube member 11. In these figures, the thicknesses of the thin plate-shaped members of the individual tube members and the depth of the recessed portion 11a are shown in an exaggerated manner.

More specifically, (A) of FIG. 4 shows that the recessed portion 11a of the inner tube member 11 has an arcuate bottom surface 111 formed concentrically with the outer cylindrical surface of the outer tube 12, and that opposed side surfaces 112 of the recessed portion 11a are parallel to each other. As shown in (B) of FIG. 4, the magnetic section C2 has an arcuate sectional shape. Further, (A) of FIG. 5 shows that the recessed portion 11a of the inner tube member 11 has an arcuate bottom surface 111 formed concentrically with the outer cylindrical surface of the outer tube 12, and that opposed side surfaces 112 of the recessed portion 11a extend away from each other in a direction toward the interior of the double tube assembly. Although the magnetic section C2 of FIG. 5 has an arcuate section shape similarly to the magnetic section C2 of FIG. 4, the opposed sides of the magnetic section C2 of FIG. 5 are shaped differently from those of the magnetic section C2 of FIG. 4 as clearly seen in (B) of FIG. 4. In the case where the elongated bar C is applied to a slide volume control device, the rigid shaft section C1 has a diameter φ of about 4 mm, and the magnetic section C2 has a thickness D of about 0.15 mm. Note that the recessed section 11a is not limited to the aforementioned examples as long as it is depressed toward the center of the inner tube member 11.

Figure 6:
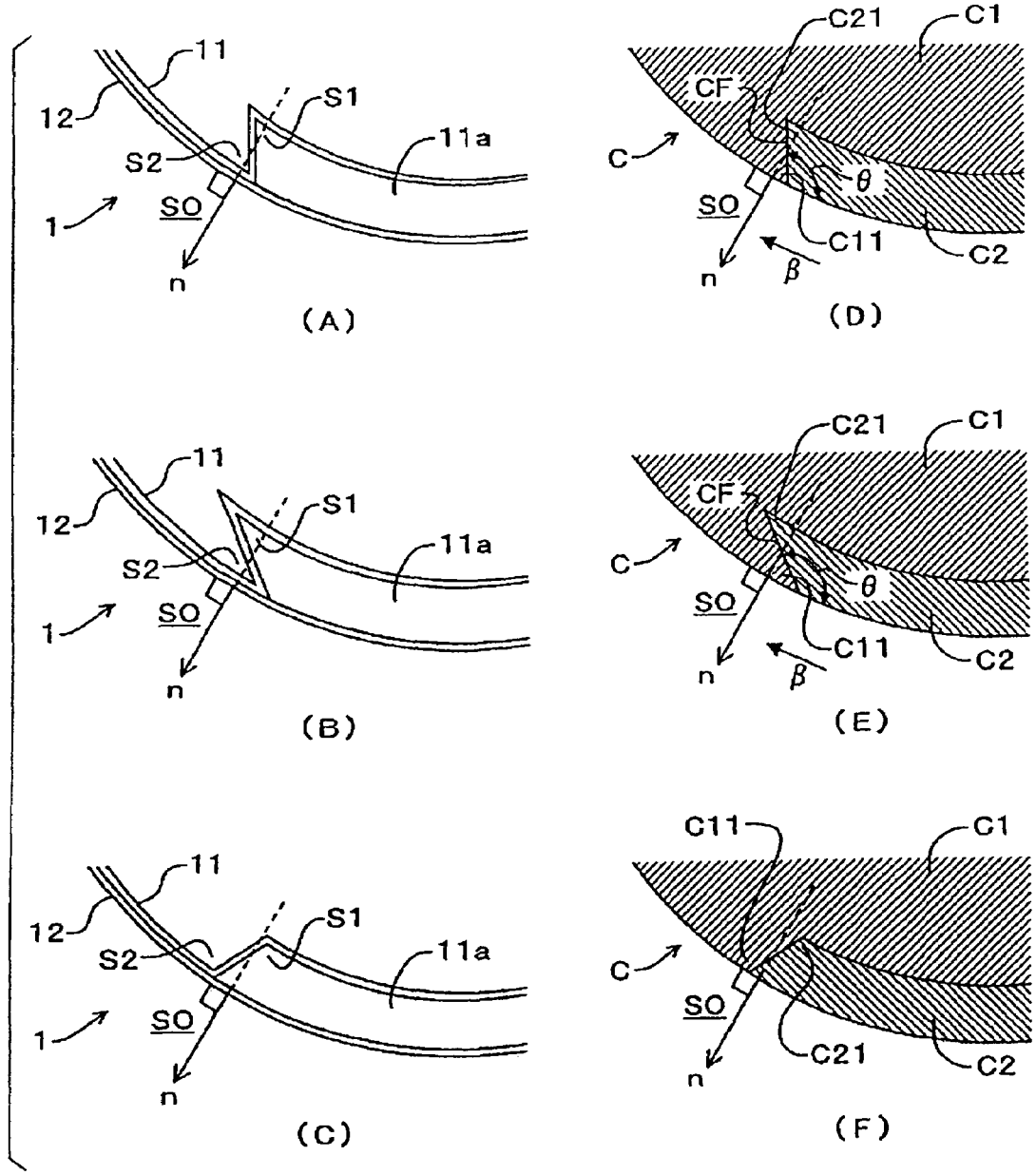
FIG. 6 is a view showing example shapes of a recessed portion and sectional shapes of the elongated bar.

In each of the inner tube members 11 shown in (A) of FIG. 4 and (A) of FIG. 5, inner corner portions S1 of the recessed portion 11a are each undercut with respect to a normal line n to the outer peripheral surface of the double tube assembly 1, as indicated in enlarged scale in (A) and (B) of FIG. 6. Such an undercut structure has the following significance. Namely, in the case where the inner corner portions S1 of the recessed portion 11a are undercut as indicated in (A) and (B) of FIG. 6, an inner space S2 adjacent to each of the outer peripheral ends, located on opposite sides of the recessed portion 11a, of the inner tube member 11 lies, on the normal line n (and extension of the normal line n), between the above-mentioned inner corner portion S1 and an outer space SO located immediately outside of the outer tube member 12. Conversely, in the case where the inner corner portions S1 of the recessed portion 11a are not undercut as indicated in (C) FIG. 6, the inner space S2 adjacent to each one of the outer peripheral ends, located on the opposite sides of the recessed portion 11a, of the inner tube member 11 does not lie on the normal line n between the inner corner portion S1 and the outer space SO located immediately outside of the outer tube member 12.

(D)-(F) of FIG. 6 are sectional views of the elongated bar C corresponding to (A)-(C) of FIG. 6. In the elongated bar C, the rigid shaft section C1 has high rigidity and hard-to-magnetize characteristic, and the magnetic section C2 is disposed as a layer uniformly and integrally on the shaft section C1 in a longitudinal (or length) direction (i.e., direction vertical to the sheet of FIG. 6) of the rigid shaft section C1. The magnetic section C2 has a cross-sectional area (i.e., area in a direction transverse to the longitudinal direction) smaller than that of the rigid shaft section C1. Further, the magnetic section C2 is secured to part of the surface of the rigid shaft section C1.

Description similar to the foregoing description about the undercut structures of the double tube assembly 1 shown in (A)-(C) of FIG. 6 applies to the shapes of the magnetic section C2 and rigid shaft section C1 of the elongated bar C. Namely, (D) and (E) of FIG. 6 show the magnetic section C2 and rigid shaft section C1 having undercut structures, in which each of the opposite outer peripheral ends C11 of the rigid shaft section C1 lies, on the normal line n, between an inner corner portion C21 of the magnetic section C2 and an outer space SO located immediately outside of the elongated bar C. (F) of FIG. 6 shows the magnetic section C2 and rigid shaft section C1 having no undercut structure, in which each of the opposite outer peripheral ends C11 of the rigid shaft section C1 does not lie between the inner corner portion C21 of the magnetic section C2 and the outer space SO located immediately outside of the elongated bar C on the normal line n.

In the case where the magnetic section C2 and rigid shaft section C1 have the undercut structure as shown in (D) or (E) of FIG. 6, an obtuse angle θ is formed, on each of the opposite sides of the magnetic section C2, by the outer peripheral surface of the magnetic section C2 and a joint section between the magnetic section C2 and the rigid shaft section C1. Thus, even when the magnetic section C2 is rubbed with a great force in a direction of arrow β, the magnetic section C2 can be reliably prevented from peeling off at any of its opposite sides. In the example of (B) of FIG. 4 (and (D) of FIG. 6), side joint surfaces CF of the magnetic section C2, along which the magnetic section C2 are joined with the rigid shaft section C1, extend parallel to each other to provide no undercut structure with respect to a center line L between the side joint surfaces CF. In the example of (B) of FIG. 5 (and (E) of FIG. 6), on the other hand, the side joint surfaces CF are formed to provide the undercut structure, which can reliably prevent the magnetic section C2 from peeling off against a force applied in a direction of arrow γ.

According to the above-described magnetic scale manufacturing method of the present invention, the relatively large composite filler A (and hence billet A'), formed by filling the rigid powder P1 and magnetic powder P2 into the double tube assembly 1, is stretched through the extrusion process, rolling process, drawing process, etc. Thus, the magnetic scale 10 can be manufactured, from the tube assembly formed with a relatively large original size, into a highly-accurate and highly-precise, small-size structure in accordance with a desired purpose. It is also possible to finely adjust the magnetic scale 10 by gradually decreasing the diameter (size) of the scale 10.

Figure 7:
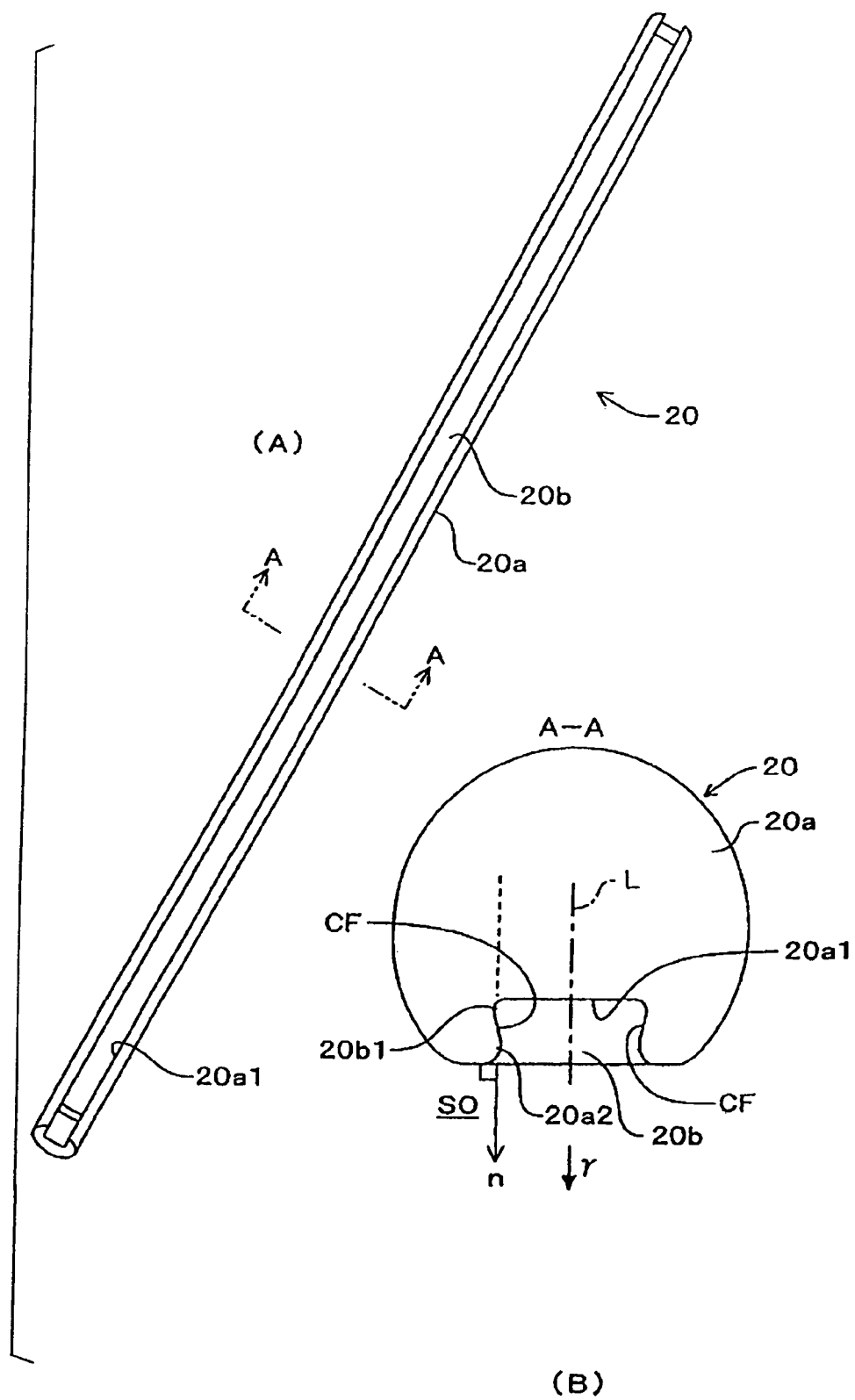
FIG. 7 is a perspective view and sectional view of another embodiment of the magnetic scale.

Next, a description will be given about another embodiment of the magnetic scale of the present invention. (A) of FIG. 7 is a perspective view of the other embodiment of the magnetic scale 20, and (B) of FIG. 7 is a sectional view of the magnetic scale 20 taken along the A-A line in (A) of FIG. 7. This magnetic scale 20 comprises a shaft section 20a as a "rigid shaft section", and a scale section 20b as a "magnetic section". The shaft section 20a is formed by subjecting nonmagnetic stainless steel (e.g., 18Cr-8Ni austenite stainless steel), which is nonmagnetic metal, to a drawing process, and it has a longitudinal groove 20a1. The scale section 20b is a plastic magnet made by mixing and kneading together ferrite powder as magnetic powder and plastic as thermoplastic resin. The scale section 20b and shaft section 20a are integrally formed by insert-molding the plastic magnet into the longitudinal groove 20a1 of the shaft section 20a.

Namely, the magnetic scale 20 of FIG. 7 is constructed as follows. The shaft section 20a has high rigidity and hard-to-magnetize characteristic, and the scale section 20a is disposed as a layer uniformly and integrally in a longitudinal direction of the shaft section 20a. The scale section 20a has a cross-sectional area (i.e., area in a direction transverse to the longitudinal direction) smaller than that of the shaft section 20a. Further, the scale section 20b is secured to part of the surface of the shaft section 20a.

Description similar to the foregoing description about the undercut structures of the double tube assembly 1 shown in (D)-(E) of FIG. 6 applies to the shapes of the scale section 20b and shaft section 20a of the magnetic scale 20. Namely, each of opposite outer peripheral ends 20a2 of the shaft section 20a lies, on the normal line n, between an inner corner portion 20b1 of the scale section 20b and an outer space SO located immediately outside of the magnetic scale 20. Further, side joint surfaces CF of the scale section 20b, along which the scale section 20b are joined with the shaft section 20a, are undercut with respect to imaginary lines extending in an inner-outer direction of the shaft section 20a on the normal line n in parallel to a center line L between the joint surfaces, which can reliably prevent the scale section 20b from peeling off against a force applied in a direction of arrow γ.

Whereas, in the above-described example, the shaft section 20a as a "rigid shaft section" is formed of nonmagnetic stainless steel, it may alternatively be formed of, for example, a brass, duralumin or ceramic material, which can resist rust and is rigid and hard to magnetize. Further, whereas ferrite powder is used in the above-described example as the magnetic powder for mixing with the plastic to form the shaft section 20a, the magnetic powder may alternatively be Fe—Cr—Co, Fe—Cu—Ni, Mn—AL—C, Nd—Fe or other powder. Further, a preferable example of a compound suited for use as the magnetic powder is RE-Co (typically, $Sm_2Co_{17}$) or the like. Further, a preferable example of an oxide suited for use as the magnetic powder is y-$Fes_2O_3$ or Fe304 (magnet iron ore). In a case where powder of a hard-to-process magnet material is used, binding metal powder is also used.

Further, whereas, in the above-described example, the shaft section 20a as the "rigid shaft section" is formed of nonmagnetic metal, it may be formed by subjecting hard resin to a drawing process, and the scale section 20*b* may be formed by insert-molding a plastic magnet into the groove 20*a*1 of the hard-resin shaft section 20*a*. Further, the scale section 20*b* may be formed of a plastic magnet through primary molding and then the hard-resin shaft section 20*a* may be molded to the scale section 20*b* through secondary molding; namely, the magnetic scale 20 may be formed by two-color molding of resin.

The shaft section 20*a* may alternatively be either formed of metal having a high magnetic permeability, or formed by mixing a material of a high magnetic permeability with hard resin. In this case, three longitudinal outer surfaces of the scale section 20*b* are covered with the shaft section 20*a*, so that there can be achieved a magnetic shield effect that can shield the magnetic scale 20 from an external magnetic field.

Various portions of the magnetic scale 20 can be set to various sizes depending on an intended application; for example, the magnetic scale 20 may be sized in the same manner as the above-described magnetic scale 10.

Figure 8:
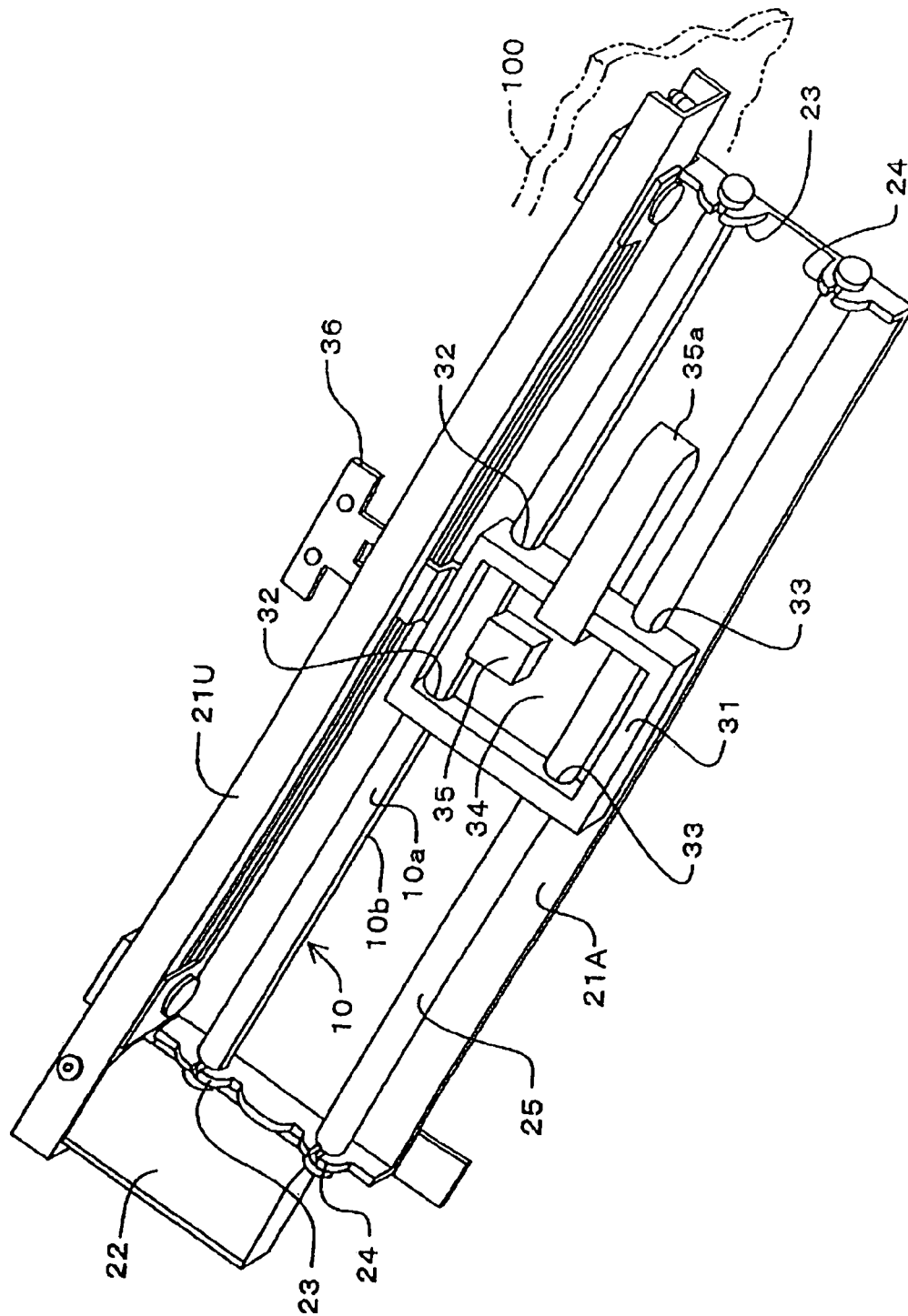
FIG. 8 is a perspective view showing principal portions of a slide volume control device using the magnetic scale of the present invention.

Next, a description will be given about applications of the magnetic scales 10 and 20. Although the magnetic scales 10 and 20 differ in size etc. depending on the application, each of these magnetic scales will hereinafter be indicated by the same reference numeral "10", for convenience of description. FIG. 8 is a perspective view showing principal portions of a slide volume control device using the magnetic scale 10 of the present invention. This slide volume control device is provided on a mixer apparatus. The slide volume control device includes a pair of side plates 21A (only one of which is visible in the figure) provided below and at a right angle to the underside of a console panel surface 100 of the mixer apparatus, and an upper frame 21U of a channel cross-section. The side plates 21A and upper frame 21U together constitute a frame. Motor 22 is fixed to one end of the upper frame 21U. Further, opposite ends of each of the side plates 21A have claws 23 and 24 formed thereon by bending. The magnetic scale 10 is attached as a movement guide between the opposed claws 23, while an auxiliary movement guide 25 is attached between the opposed claws 24.

Moving block 31 is mounted on the magnetic scale 10 and auxiliary movement guide 25 in such a manner that it is slidable in a longitudinal direction of the scale 10 and guide 25. The moving block 31 has a lever 36 in which a not-shown operator is fitted. The motor 22 reciprocatively moves the moving block 31 for automatically setting a position of a slide operator of the slider volume control device.

The moving block 31, which is formed of resin, has a pair of guide holes 32 formed, in upper portions of its rectangular frame, for fitting therein the magnetic scale 10, and a pair of auxiliary guide holes 33, formed in lower portions of the rectangular frame for fitting therein the auxiliary movement guide 25. Base plate 34 is attached to the inner surface of the frame, and a magnetic sensor 35 is attached to the base plate 34. Flat cable 36 via which to output detection signals of the magnetic sensor 35 is connected to the base plate 34.

The magnetic scale 10 comprises a shaft section 10*a* in the form the aforementioned rigid shaft section 1 formed of non-magnetic stainless steel (18Cr-8Ni-austenite stainless steel), and a scale section 10*b* formed by magnetizing the aforementioned magnetic section C2 of a permanent magnet material (Fe—Cr—Co) into a magnetic scale structure. The magnetic section C2 is polarized or magnetized to N and S poles alternating, along the length of the magnetic section C2, in, for example, 330 μm cycles (pitches), and the magnetic sensor 35 is positioned in opposed relation to the scale section 10*b*. The magnetic sensor 35 includes two magnetic resistor elements (MR elements), and as the moving block 35 moves along the magnetic scale 10 and auxiliary movement guide 25, the magnetic sensor 35 outputs a signal by sensing the magnetic poles of the scale section 10*b*. The detection signals of the magnetic sensor 35 are sent, via the flat cable 36, to a not-shown circuit.

More specifically, in response to the movement of the moving block 31, the magnetic sensor 35 outputs pulse signals corresponding to polarity reversal between the N and S poles of the scale section 10*b*, and an amount (length) of the movement of the moving block 31 can be detected on the basis of the number of the pulse signals. Further, the N and S poles are provided in a plurality of (e.g., two) rows on the scale section 10*b*, and the magnetic pole patterns of the two rows are shifted in phase from each other by $\frac{1}{2}\pi$. Thus, the magnetic sensor 35 outputs phase-shifted pulse signals, so that a direction of the movement of the moving block 31 can be identified on the basis of the positive or negative polarity of the phase shift. Alternatively, the two rows of the magnetic poles may be arranged on the scale section 10*b* in "NSNS, . . . ." patterns with no phase shift therebetween, in which case detecting poles of the magnetic sensor may be arranged with a phase shift of $\frac{1}{2}\pi$.

Figure 9:
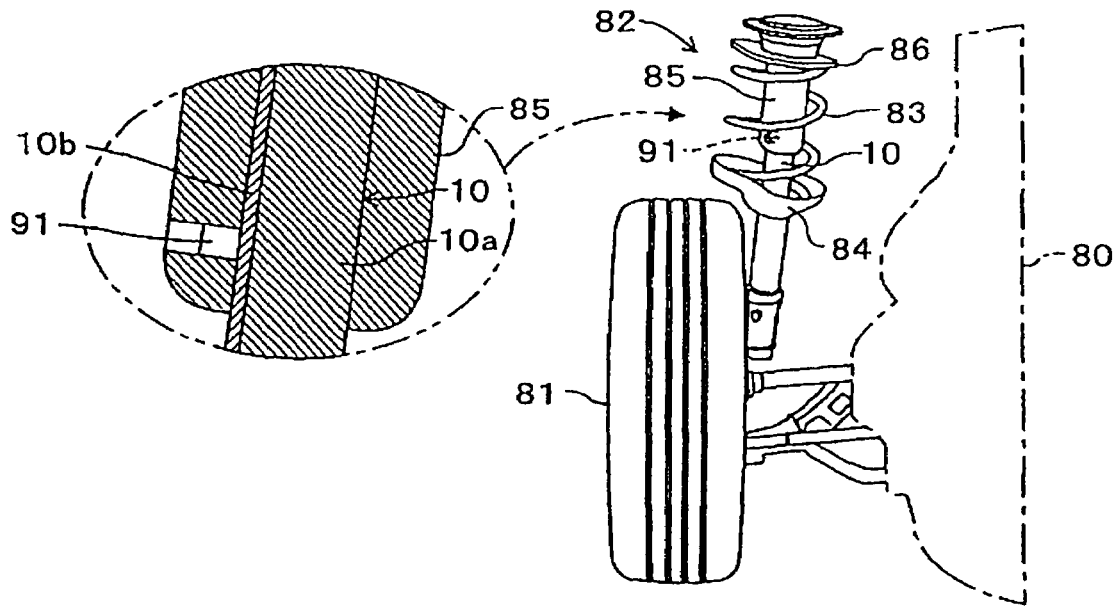
FIG. 9 is a perspective view showing principal portions of a suspension section in an automotive vehicle employing the aforementioned magnetic scale of the present invention.

FIG. 9 is a perspective view showing principal portions of a suspension section in an automotive vehicle employing the aforementioned magnetic scale 10 of the invention. Impact resulting from vertical movement of a road wheel 81 attached to a body 80 of the automotive vehicle is absorbed by the suspension 82. The magnetic scale 10 of the invention is used as a main shaft of the suspension 82. As indicated by a two-dot-dash-line oval balloon in the figure, the magnetic scale 10, as set forth above, comprises the shaft section 10*a* formed of nonmagnetic stainless (18Cr-8Ni-austenite stainless steel), and the scale section 10*b* formed of a permanent magnet material (Fe—Cr—Co magnet). The scale section 10*b* is magnetized to N and S poles alternating along its length, as set forth above.

Spring support shaft 84 for supporting one end of a spring 83 of the suspension 82 is secured to the magnetic scale 10. The magnetic scale 10 is slidably retained by a support shaft 85 fixed to the vehicle body 82. The spring 83 has the other end abutted against a spring stop 86 provided on the support shaft 85. Magnetic sensor 91 is embedded in the support shaft 85 by means of a screw or the like, and the magnetic sensor 91 is opposed to the magnetic scale 10. Vertical movement of the magnetic scale 10, i.e. main shaft, relative to the support shaft 85, is detected on the basis of detection signals of the magnetic sensor 91, and travel of the vehicle can be controlled on the basis of the detection of the vertical movement of the magnetic scale 10.

As another embodiment, the magnetic scale 10 may also be applied to a slide shaft for slidably holding a print head holder of a printing apparatus, although not particularly shown. In this case, a magnetic sensor is mounted on the print head holder, and the magnetic poles of the scale section 10*b* of the magnetic scale 10 (slide shaft) are sensed by the magnetic sensor to detect a position of the print head holder and hence the print head As clear from the foregoing description, the magnetic scale of the present invention is suited for use in frequently sliding (moving) or hardworked portions, such as in slide vole control devices, suspension sections and printing apparatus. Because, in these cases, not only the shaft section 10*a* (rigid shaft section C1) but also the scale section 10*b* (magnetic section C2) of the magnetic scale 10 is constructed sturdily, the magnetic scale of the present invention can present high durability and suitability as a guide or slide shaft for a moving section (such as the aforementioned moving block 31 or print head holder) or main shaft for a fixed section (such as the aforementioned support shaft 85). Particularly, the magnetic scale of the present invention can stand use in bad environment, e.g., in a suspension section of an automotive vehicle.

Figure 10:
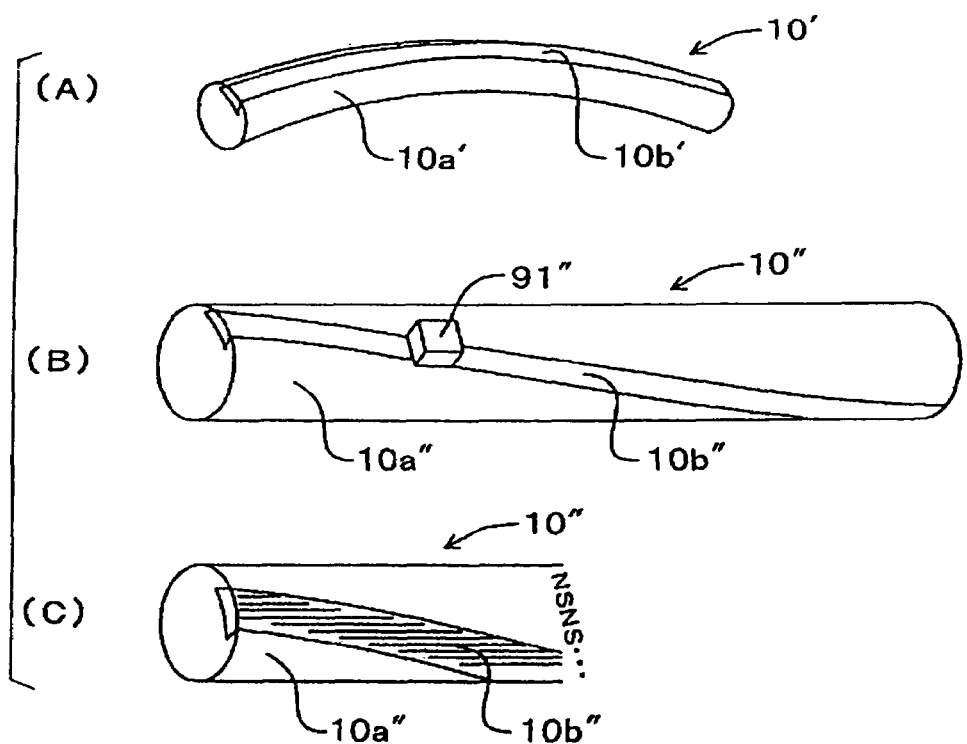
FIG. 10 is a view showing still other embodiments of the magnetic scale.

FIG. 10 shows still other embodiments of the magnetic scale of the present invention. The magnetic scale 10' shown in (A) of FIG. 10 comprises a shaft section 10a' and scale section 10b' each formed into an arcuate shape. In order to provide such a magnetic scale 10', it is only necessary to form the double tube assembly, explained above in relation to FIG. 1, into a shape such that the center axis extends arcuately. With the arcuate center axis, the inner tube member can be drawn arcuately in the drawing process. In this magnetic scale 10' too, the scale section 10b' is polarized or magnetized to N and S poles alternating along its length, in a manner similar to that shown in (B) of FIG. 3, so that a position and amount of movement along the arcuate scale section can be detected by a magnetic sensor.

The magnetic scale 10" shown in (B) of FIG. 10 includes a helically-twisted scale section 10b" provided on the outer periphery of a linear shaft section 10a". In order to provide such a magnetic scale 10", it is only necessary to draw, in the sixth step (g) of FIG. 1, the inner tube member 11 while twisting the inner tube member 11 relative to the outer tube member 12. This is an advantage achieved by the fact that what is filled within the double tube assembly 1 is powder; alternatively, the recessed portion 11a of the inner tube member 11 may be formed into a helical shape so that the inner tube member 11 can be drawn while being twisted along the helical shape of the recessed portion 11a. In this case, the scale section 10b" of the magnetic scale 10" is magnetized to N and S poles alternating in a circumferential direction of the shaft section 10a" as shown in (C) of FIG. 10.

The magnetic scale 10" is suitable for use in a mechanism where a magnetic sensor 91" moves relative to and along the scale section 10b" (i.e., so that it may not deviate from the scale section 10b"). In a case where the magnetic sensor 91" is fixed, for example, the magnetic scale 10" is linearly moved while being rotated, so that a twisting position and twisting amount of the scale 10" can be detected. The twisting position may be detected directly, but, in a case where the scale section 10b" is magnetized to N and S poles alternating in the axial direction as in the example of (B) of FIG. 3, the twisting position can be detected on the basis of a position in the axial direction because an amount of movement in the axial direction and twisting amount (angle) are in proportional relationship.

Whereas the embodiments of the present invention have been described above in relation to the case where the double tube assembly, inner tube member and outer tube member are each of a cylindrical shape and the elongated bar and magnetic scale are each of a columnar shape, the present invention is not so limited, and the double tube assembly, inner tube member and outer tube member may each be of any desired polygonal cross-sectional shape (i.e., may be of any desired shape as viewed transversely through the axis), such as a triangular shape, quadrangular shape, pentagonal shape or the like.

The magnetic scale of the present invention can be suitably applied to detect a relative moving position and amount of the movement between a plurality of members movable relative to each other not only in the aforementioned slide volume device, vehicular suspension and printing apparatus but also in various other apparatus, such as auto-focusing mechanisms of cameras.

What is claimed is:

1. A magnetic scale comprising:
   an elongated rigid shaft section having high rigidity and hard-to-magnetize characteristic including a nonmagnetic characteristic; and
   a magnetic section disposed as a layer uniformly and integrally on said rigid shaft section in a longitudinal direction of said rigid shaft section,
   said elongated rigid shaft section having, in an outer surface portion thereof an elongated groove for embedding therein said magnetic section, said elongated groove in said elongated rigid shaft section being formed in an undercut structure with an opening width of the groove smaller than a width of a bottom of the groove,
   said magnetic section having a sectional shape fitting for the undercut structure of the elongated groove, said magnetic section being secured to the elongated groove of said rigid shaft section and magnetized to a magnetic scale structure.

2. A magnetic scale as claimed in claim 1 wherein said magnetic section is formed of an alloy permanent magnet material.

3. A magnetic scale as claimed in claim 1 wherein said magnetic section is formed of a copper-nickel alloy.

4. A magnetic scale as claimed in claim 1 wherein said rigid shaft section is formed of metal or high-strength resin, and said magnetic section is a resin-mixed magnet and formed by being insert-molded to said rigid shaft section.

5. A magnetic scale as claimed in 4 wherein said rigid shaft section is formed of the high-strength resin, and wherein magnetic section is formed through primary molding and said rigid shaft section is formed onto said magnetic section through secondary molding.

6. A magnetic scale as claimed in 1 wherein said magnetic section has a layer thickness in a range from 0.1 mm to 1 mm.

7. A magnetic scale comprising:
   an elongated rigid shaft section having high rigidity and high magnetic permeability; and
   a magnetic section disposed as a layer uniformly and integrally on said rigid shaft section in a longitudinal direction of said rigid shaft section,
   said elongated rigid shaft section having, in an outer surface portion thereof an elongated groove for embedding therein said magnetic section, said elongated groove in said elongated rigid shaft section being formed in an undercut structure with an opening width of the groove smaller than a width of a bottom of the groove,
   said magnetic section having a sectional shape fitting for the undercut structure of the elongated groove, said magnetic section being secured to the elongated groove of said rigid shaft section and magnetized to a magnetic scale structure.

8. A magnetic scale as claimed in claim 7 wherein said magnetic section is formed of an alloy permanent magnet material.

9. A magnetic scale as claimed in claim 7 wherein said magnetic section is formed of a copper-nickel alloy.

10. A magnetic scale as claimed in claim 7 wherein said rigid shaft section is formed of metal or high-strength resin having a material of a high magnetic permeability mixed therein, and said magnetic section is a resin-mixed magnet and formed by being insert-molded to said rigid shaft section.

11. A magnetic scale as claimed in 10 wherein said rigid shaft section is formed of the high-strength resin, and wherein said magnetic section is formed through primary molding and said rigid shaft section is formed onto said magnetic section through secondary molding.

12. A magnetic scale as claimed in 7 wherein said magnetic section has a layer thickness in a range from 0.1 mm to 1 mm.

* * * * *